US011947237B2

(12) United States Patent
Ozaki et al.

(10) Patent No.: US 11,947,237 B2
(45) Date of Patent: Apr. 2, 2024

(54) SEMICONDUCTOR MACH ZEHNDER OPTICAL MODULATOR

(71) Applicant: Nippon Telegraph and Telephone Corporation, Tokyo (JP)

(72) Inventors: Josuke Ozaki, Tokyo (JP); Hiromasa Tanobe, Tokyo (JP); Shigeru Kanazawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 338 days.

(21) Appl. No.: 17/420,004

(22) PCT Filed: Jan. 8, 2020

(86) PCT No.: PCT/JP2020/000249
§ 371 (c)(1),
(2) Date: Jun. 30, 2021

(87) PCT Pub. No.: WO2020/149185
PCT Pub. Date: Jul. 23, 2020

(65) Prior Publication Data
US 2022/0050349 A1 Feb. 17, 2022

(30) Foreign Application Priority Data
Jan. 16, 2019 (JP) .................................. 2019-005050

(51) Int. Cl.
*G02F 1/21* (2006.01)
*G02F 1/225* (2006.01)

(52) U.S. Cl.
CPC ............ *G02F 1/212* (2021.01); *G02F 1/2257* (2013.01)

(58) Field of Classification Search
CPC ............................... G02F 1/2257; G02F 1/212
See application file for complete search history.

(56) References Cited

U.S. PATENT DOCUMENTS

2014/0233962 A1 8/2014 Kato
2016/0062207 A1* 3/2016 Bai ...................... G02F 1/2257
385/3

FOREIGN PATENT DOCUMENTS

JP 2017173385 A 9/2017
WO 2013042753 A1 3/2013

OTHER PUBLICATIONS

Ogiso et al. "Ultra-High Bandwidth InP IQ Modulator co-assembled with Driver IC for Beyond 100-GBd CDM", Th4A.2, Optical Fiber Communication Conference (OFC), 2018, 3 pages. As discussed in the specification.

(Continued)

*Primary Examiner* — Sung H Pak
(74) *Attorney, Agent, or Firm* — Slater Matsil, LLP

(57) ABSTRACT

A semiconductor Mach-Zehnder optical modulator includes input side lead-out lines, phase modulation electrode lines, output side lead-out lines, electrodes that apply modulation signals propagating through the phase modulation electrode lines to respective waveguides, and ground lines. Furthermore, at least one n-type semiconductor layer or p-type semiconductor layer is formed between a substrate and a dielectric layer in a lower layer under the output side lead-out lines intermittently along the output side lead-out lines.

20 Claims, 9 Drawing Sheets

(56) References Cited

OTHER PUBLICATIONS

Ozaki, et al., "Ultra-low Power Dissipation (< 2.4 W) Coherent InP Modulator Module with CMOS Driver IC", Mo3C.2, European Conference on Optical Communication (ECOC), 2018. As discussed in the specification.

Wolf et al., "Electro-Optical Co-Design to Minimize Power Consumption of a 32 GBd Optical IQ-Transmitter Using InP MZ-Modulators", Compound Semiconductor Integrated Circuit Symposium (CSICS), IEEE, 2015, 4 pages. As discussed in specification.

\* cited by examiner

SEMICONDUCTOR MACH ZEHNDER OPTICAL MODULATOR

CROSS-REFERENCE TO RELATED APPLICATIONS

This application is a national phase entry of PCT Application No. PCT/JP2020/000249, filed on Jan. 8, 2020, which claims priority to Japanese Application No. 2019-005050, filed on Jan. 16, 2019, which applications are hereby incorporated herein by reference.

TECHNICAL FIELD

The present invention relates to a semiconductor Mach-Zehnder optical modulator that modulates an optical signal with an electrical signal.

BACKGROUND

There is a need for high speed optical modulators supporting advanced optical modulation schemes to respond to increasing communication traffic demands. In particular, multi-level optical modulators using digital coherent technology play a major role in enabling large capacity transceivers to have a capacity over 100 Gbps. These multi-level optical modulators are configured to include Mach-Zehnder optical modulators (Mach-Zehnder modulators, hereinafter MZM) of a Mach-Zehnder interference type capable of zero chirp driving arranged in a parallel and multistage manner in order to add independent signals to an amplitude and phase of the light.

In recent years, miniaturization and reduction in drive voltage of optical transmitter modules are a challenge, and research and development of small semiconductor MZMs capable of having a low drive voltage has been vigorously advanced. Furthermore, in the research and development of semiconductor MZMs, a movement responding to an increase in baud rate, such as 64 GBaud and 100 GBaud, is accelerated, and there is a demand for an increase in bands of modulators.

In such research and development, research and development of a high bandwidth coherent driver modulator (HB-CDM) is accelerated which is aimed at achieving miniaturization not only by improving characteristics in a modulator alone but also by improving high frequency characteristics owing to a driver and modulator codesign where a driver and a modulator are integrated into one package (see NPL 1). In a configuration of the HB-CDM, because a modulator is integrated with a differential driven driver, the modulator itself preferably also has a differential driven configuration.

In broadband MZMs, traveling wave electrodes are commonly used. For such a traveling wave electrode, factors (I) and (II) below are very important to improve a modulation band.

(I) Velocity matching between a microwave propagating through the electrode and a light propagating through a waveguide.

(II) Reduction in a propagation loss of an electrode.

Moreover, for the HB-CDM, which has recently been actively researched and developed, design including a driver as well as a modulator is very important for integrating the driver and the modulator. In particular, in the HB-CDM, an open collector type or open drain type driver is used to achieve low power consumption (see NPL 2).

In the open collector type or open drain type driver, an output end is an open end, so if a high frequency line of the modulator is not successfully terminated, and a modulation signal returns through the high frequency line, a resonance occurs between the driver and a termination resistor, which leads to degradation of a modulation band and periodic waviness in high frequency characteristics, which leads to degradation of signal quality. As such, in recent years, the importance of the following factor (III) has greatly increased.

(III) Impedance matching between an electrode of a modulator and a driver or a termination resistor.

The three factors (I), (II), and (III) above are very important in achieving an increase in baud rate. Regarding (I) and (II), techniques have been proposed, such as using a differential capacitance-loaded electrode structure or a low-loss semiconductor layer structure in consideration of connectivity with a driver and other characteristics (see NPL 3). The capacitance-loaded structure is designed to form a T-shaped electrode branched from a main wiring on a waveguide to perform phase modulation. By optimally designing the number and spacing of electrodes contributing to this phase modulation and a contact length to the waveguide, the amount of capacitance to be added to the main wiring can be freely designed, which makes it possible to design the impedance and the velocity of microwaves in any value. As such, by designing the optimal amount of capacitance to be added, it is possible to improve the velocity matching between the light wave and the microwave and also match the impedances. As a result, bands of modulators can be increased.

On the other hand, regarding (III), because of manufacturing variation of electrodes, waveguides, and the like, production variation of terminal resistances, and high frequency characteristics derived from the individual structures, the impedance matching is very difficult to carry out across the entire region in a range of broadband (about 40 GHz for 64 Gbaud and about 60 GHz for 100 GBaud) for achieving the high baud rate such as 64 GBaud, 100 Gbaud, and the like. Therefore, in particular, in a case where the open collector type or open drain type driver as described above is connected with the MZM, the modulation characteristics degrade due to the effect of reflection waves. As described above, there is a need for a technique for preventing effects of impedance mismatching between components at the present time where an increase in baud rate is required.

CITATION LIST

Non Patent Literature

NPL 1: J. Ozaki, et al., "Ultra-low Power Dissipation (<2.4 W) Coherent InP Modulator Module with CMOS Driver IC", M03C.2, European Conference on Optical Communication (ECOC), 2018

NPL 2: N. Wolf, et al., "Electro-Optical Co-Design to Minimize Power Consumption of a 32 GBd Optical IQ-Transmitter Using InP MZ-Modulators", Compound Semiconductor Integrated Circuit Symposium (CSICS), 2015

NPL 3: Y. Ogiso, et al., "Ultra-High Bandwidth InP IQ Modulator co-assembled with Driver IC for Beyond 100-GBd CDM", Th4A.2, Optical Fiber Communication Conference (OFC), 2018.

SUMMARY

Technical Problem

An object of embodiments of the present invention is to prevent effects of reflection waves due to impedance mismatching occurring between a high frequency line and a termination resistor of a semiconductor Mach-Zehnder optical modulator and solve degradation of high frequency characteristics of the optical modulator resulting from the impedance mismatching.

Means for Solving the Problem

A semiconductor Mach-Zehnder optical modulator according to embodiments of the present invention includes: an optical waveguide formed on a substrate; an input side lead-out line formed on at least one dielectric layer on the substrate, the input side lead-out line including a first end to which a modulation signal is input; a phase modulation electrode line formed on the dielectric layer along the optical waveguide, the phase modulation electrode line including a first end connected to a second end of the input side lead-out line; an output side lead-out line formed on the dielectric layer, the output side lead-out line including a first end connected to a second end of the phase modulation electrode line; and an electrode configured to apply a modulation signal to the optical waveguide, the modulation signal propagating through the phase modulation electrode line, wherein the semiconductor Mach-Zehnder optical modulator further includes an attenuator configured to attenuate the modulation signal in a lower layer under the output side lead-out line or an upper layer over the output side lead-out line.

In a configuration example of the semiconductor Mach-Zehnder optical modulator according to embodiments of the present invention, the attenuator is at least one n-type semiconductor layer or at least one p-type semiconductor layer that is formed intermittently along the output side lead-out line in the lower layer under the output side lead-out line.

In a configuration example of the semiconductor Mach-Zehnder optical modulator according to embodiments of the present invention, in a portion of the output side lead-out line, a length of each of the n-type semiconductor layer or the p-type semiconductor layer in a propagation direction of the modulation signal is ¼ or less of a guide wavelength of a maximum frequency in a band of the modulation signal, a width of the n-type semiconductor layer or the p-type semiconductor layer in a direction perpendicular to the propagation direction of the modulation signal is ¼ or less of the guide wavelength, and a gap between a plurality of the n-type semiconductor layers or a plurality of the p-type semiconductor layers in the propagation direction of the modulation signal is 50 μm or less.

In a configuration example of the semiconductor Mach-Zehnder optical modulator according to embodiments of the present invention, the optical waveguide includes two arm waveguides of first and second arm waveguides, the input side lead-out line includes a first input side lead-out line and a second input side lead-out line, the first input side lead-out line including a first end to which a modulation signal is input, the second input side lead-out line being on the dielectric layer adjacent to the first input side lead-out line and including a first end to which a signal complementary to the modulation signal is input, the phase modulation electrode line includes two phase modulation electrode lines of first and second phase modulation electrode lines on the dielectric layer along the respective first and second arm waveguides, the first and second phase modulation electrode lines including first ends connected to respective second ends of the first and second input side lead-out lines, the output side lead-out line includes two output side lead-out lines of first and second output side lead-out lines, the first and second output side lead-out lines including first ends connected to respective second ends of the first and second phase modulation electrode lines, the electrode includes two electrodes of first and second electrodes configured to apply respective modulation signals to the first and second arm waveguides, the respective modulation signals propagating through the first and second phase modulation electrode lines, the semiconductor Mach-Zehnder optical modulator further includes a first ground line along the propagation direction of the modulation signal on the dielectric layer outside the first input side lead-out line, the first phase modulation electrode line, and the first output side lead-out line, and a second ground line along the propagation direction of the modulation signal on the dielectric layer outside the second input side lead-out line, the second phase modulation electrode line, and the second output side lead-out line, in a portion of the first and second output side lead-out lines, a width of the n-type semiconductor layer or the p-type semiconductor in the direction perpendicular to the propagation direction of the modulation signal is equal to or more than a distance between the first and second ground lines, and the n-type semiconductor layer or the p-type semiconductor layer is formed below edges of the first and second ground lines, the edges being closer to the respective output side lead-out lines than other edges of the first and second ground lines.

In a configuration example of the semiconductor Mach-Zehnder optical modulator according to embodiments of the present invention, the optical waveguide includes two arm waveguides of first and second arm waveguides, the input side lead-out line includes a first input side lead-out line and a second input side lead-out line, the first input side lead-out line including a first end to which a modulation signal is input, the second input side lead-out line being on the dielectric layer adjacent to the first input side lead-out line and including a first end to which a signal complementary to the modulation signal is input, the phase modulation electrode line includes two phase modulation electrode lines of first and second phase modulation electrode lines on the dielectric layer along the respective first and second arm waveguides, the first and second phase modulation electrode lines including first ends connected to respective second ends of the first and second input side lead-out lines, the output side lead-out line includes two output side lead-out lines of first and second output side lead-out lines, the first and second output side lead-out lines including first ends connected to respective second ends of the first and second phase modulation electrode lines, the electrode includes two electrodes of first and second electrodes configured to apply respective modulation signals to the first and second arm waveguides, the respective modulation signals propagating through the first and second phase modulation electrode lines, and in a straight portion of the first and second output side lead-out lines, the n-type semiconductor layer or the p-type semiconductor layer is disposed such that a position of a midpoint between the first and second output side lead-out lines in the direction perpendicular to the propagation direction of the modulation signal matches a position of a center point of the n-type semiconductor layer or the p-type semiconductor layer in the direction perpendicular to the propagation direction of the modulation signal, and the n-type semiconductor layer or the p-type semiconductor has a cross-section that is bilaterally symmetric with respect to a perpendicular line in a thickness direction passing through the center point.

In a configuration example of the semiconductor Mach-Zehnder optical modulator according to embodiments of the present invention, the optical waveguide includes two arm waveguides of first and second arm waveguides, the input side lead-out line includes a first input side lead-out line and a second input side lead-out line, the first input side lead-out line including a first end to which a modulation signal is input, the second input side lead-out line being on the dielectric layer adjacent to the first input side lead-out line and including a first end to which a signal complementary to the modulation signal is input, the phase modulation electrode line includes two phase modulation electrode lines of first and second phase modulation electrode lines on the dielectric layer along the respective first and second arm waveguides, the first and second phase modulation electrode lines including first ends connected to respective second ends of the first and second input side lead-out lines, the output side lead-out line includes two output side lead-out lines of first and second output side lead-out lines, the first and second output side lead-out lines including first ends connected to respective second ends of the first and second phase modulation electrode lines, the electrode includes two electrodes of first and second electrodes configured to apply respective modulation signals to the first and second arm waveguides, the respective modulation signals propagating through the first and second phase modulation electrode lines, the first and second output side lead-out lines are bent in a direction intersecting a direction in which the first and second arm waveguides extend in a plane of the dielectric layer, and in a bent portion of the first and second output side lead-out lines, the n-type semiconductor layer or the p-type semiconductor layer is disposed such that a center point of the n-type semiconductor layer or the p-type semiconductor layer in the direction perpendicular to the propagation direction of the modulation signal is shifted to an outer peripheral side of the bent portion of the first and second output side lead-out lines with respect to a midpoint between the first and second output side lead-out lines in the direction perpendicular to the propagation direction of the modulation signal.

In a configuration example of the semiconductor Mach-Zehnder optical modulator according to embodiments of the present invention, the optical waveguide includes two arm waveguides of first and second arm waveguides, the input side lead-out line includes a first input side lead-out line and a second input side lead-out line, the first input side lead-out line including a first end to which a modulation signal is input, the second input side lead-out line being on the dielectric layer adjacent to the first input side lead-out line and including a first end to which a signal complementary to the modulation signal is input, the phase modulation electrode line includes two phase modulation electrode lines of first and second phase modulation electrode lines on the dielectric layer along the respective first and second arm waveguides, the first and second phase modulation electrode lines including first ends connected to respective second ends of the first and second input side lead-out lines, the output side lead-out line includes two output side lead-out lines of first and second output side lead-out lines, the first and second output side lead-out lines including first ends connected to respective second ends of the first and second phase modulation electrode lines, the electrode includes two electrodes of first and second electrodes configured to apply respective modulation signals to the first and second arm waveguides, the respective modulation signals propagating through the first and second phase modulation electrode lines, and a line width of each of the first and second output side lead-out lines in the direction perpendicular to the propagation direction of the modulation signal is wider in a portion immediately under which the n-type semiconductor layer or the p-type semiconductor layer is not present than in a portion immediately under which the n-type semiconductor layer or the p-type semiconductor layer is present.

In a configuration example of the semiconductor Mach-Zehnder optical modulator according to embodiments of the present invention, the optical waveguide includes two arm waveguides of first and second arm waveguides, the input side lead-out line includes a first input side lead-out line and a second input side lead-out line, the first input side lead-out line including a first end to which a modulation signal is input, the second input side lead-out line being on the dielectric layer adjacent to the first input side lead-out line and including a first end to which a signal complementary to the modulation signal is input, the phase modulation electrode line includes two phase modulation electrode lines of first and second phase modulation electrode lines on the dielectric layer along the respective first and second arm waveguides, the first and second phase modulation electrode lines including first ends connected to respective second ends of the first and second input side lead-out lines, the output side lead-out line includes two output side lead-out lines of first and second output side lead-out lines, the first and second output side lead-out lines including first ends connected to respective second ends of the first and second phase modulation electrode lines, the electrode includes two electrodes of first and second electrodes configured to apply respective modulation signals to the first and second arm waveguides, the respective modulation signals propagating through the first and second phase modulation electrode lines, the semiconductor Mach-Zehnder optical modulator further includes a first ground line along the propagation direction of the modulation signal on the dielectric layer outside the first input side lead-out line, the first phase modulation electrode line, and the first output side lead-out line, and a second ground line along the propagation direction of the modulation signal on the dielectric layer outside the second input side lead-out line, the second phase modulation electrode line, and the second output side lead-out line, the first and second output side lead-out lines are bent in a direction intersecting a direction in which the first and second arm waveguides extend in a plane of the dielectric layer and each have a line width shorter in a bent portion than in a straight portion in the direction perpendicular to the propagation direction of the modulation signal, and the first and second ground lines are bent along the first and second output side lead-out lines and each have a shorter inter-line distance to a corresponding one of the first and second output side lead-out lines in the bent portion than in the straight portion.

In a configuration example of the semiconductor Mach-Zehnder optical modulator according to embodiments of the present invention, the optical waveguide includes two arm waveguides of first and second arm waveguides, the input side lead-out line includes a first input side lead-out line and a second input side lead-out line, the first input side lead-out line including a first end to which a modulation signal is input, the second input side lead-out line being on the dielectric layer adjacent to the first input side lead-out line and including a first end to which a signal complementary to the modulation signal is input, the phase modulation electrode line includes two phase modulation electrode lines of first and second phase modulation electrode lines on the dielectric layer along the respective first and second arm waveguides, the first and second phase modulation electrode lines including first ends connected to respective second ends of the first and second input side lead-out lines, the output side lead-out line includes two output side lead-out lines of first and second output side lead-out lines, the first and second output side lead-out lines including first ends connected to respective second ends of the first and second phase modulation electrode lines, the electrode includes two electrodes of first and second electrodes configured to apply respective modulation signals to the first and second arm waveguides, the respective modulation signals propagating through the first and second phase modulation electrode lines, the semiconductor Mach-Zehnder optical modulator further includes a first ground line along the propagation direction of the modulation signal on the dielectric layer outside the first input side lead-out line, the first phase modulation electrode line, and the first output side lead-out line, and a second ground line along the propagation direction of the modulation signal on the dielectric layer outside the second input side lead-out line, the second phase modulation electrode line, and the second output side lead-out line, and the semiconductor Mach-Zehnder optical modulator further includes a plurality of wires electrically connecting between the first and second ground lines, the plurality of wires being provided at intervals of ¼ or less of a guide wavelength of a maximum frequency in a band of the modulation signal.

Effects of Embodiments of the Invention

According to embodiments of the present invention, by disposing an attenuator that attenuates a modulation signal between a substrate and a dielectric layer in a lower layer under an output side lead-out line or on an upper layer over the output side lead-out line, a reflection wave due to impedance mismatching generated between the output side lead-out line and a termination resistor can be prevented from returning to a phase modulation portion including an electrode, or an open collector type or open drain type driver connected to a semiconductor Mach-Zehnder optical modulator, to minimize effects on modulation characteristics of the semiconductor Mach-Zehnder optical modulator. As a result, embodiments of the present invention can provide an excellent semiconductor Mach-Zehnder optical modulator capable of a high baud rate operation that suppresses degradation of phase modulation characteristics resulting from impedance mismatching and has smooth modulation characteristics across a wide area.

DETAILED DESCRIPTION OF ILLUSTRATIVE EMBODIMENTS

Principles of Embodiments of the Invention

In design of a MZM, electrodes each including three portions of an input side lead-out line connected with a driver, a phase modulation electrode line formed along a waveguide of a Mach-Zehnder interferometer, and an output side lead-out line connected to a termination resistor, are generally made to basically have a small propagation loss in order to achieve an increase in a band.

However, because the output side lead-out line is an electrode after phase modulation, the propagation loss in the electrode basically does not affect a modulation signal for performing phase modulation, and does not affect the degradation of a modulation band of the MZM. On the other hand, a reflection wave resulting from impedance mismatching between a high frequency line and the terminal resistance of the MZM greatly affects the degradation of the modulation band and modulation characteristics of the MZM.

Thus, embodiments of the present invention intentionally make the output side lead-out line have a propagation loss such that the reflection wave due to the impedance mismatching between the line and the terminal resistance of the MZM is prevented from returning to a phase modulation portion to minimize the effect on the modulation characteristics of the MZM and achieve excellent high frequency characteristics over a wide area.

Hereinafter, an embodiment of the present invention will be described with reference to drawings.

Embodiment

Figure 1:
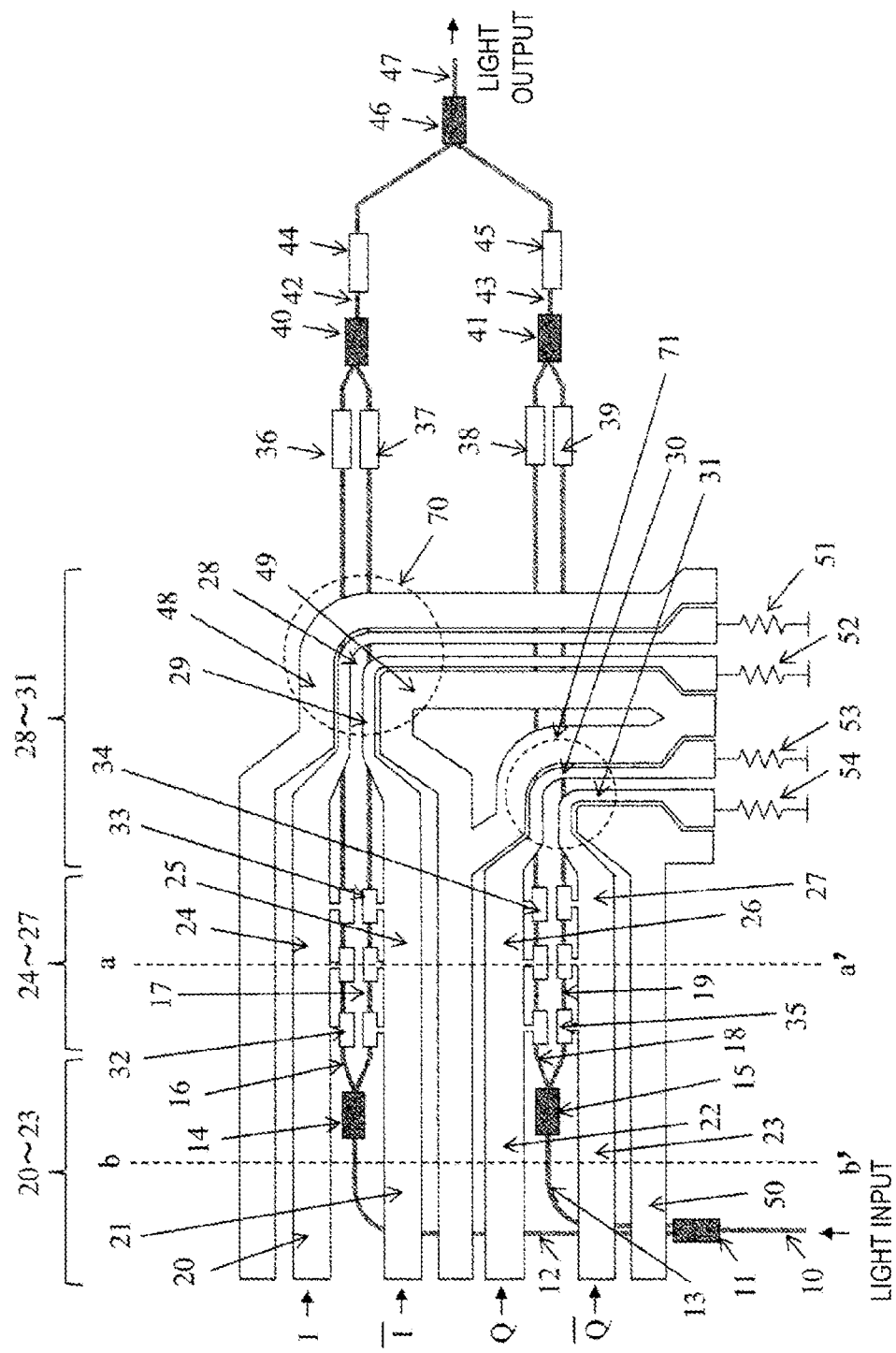
FIG. 1 is a plan view illustrating a configuration of an in-phase and quadrature (IQ) modulator according to an embodiment of the present invention.

FIG. 1 is a plan view illustrating a configuration of an IQ modulator according to an embodiment of the present invention. The IQ modulator includes an input waveguide 10, a 1×2 multimode interface (MMI) coupler 11, waveguides 12 and 13, a 1×2 MMI coupler 14, a 1×2 MMI coupler 15, waveguides 16 and 17 (first and second arm waveguides), waveguides 18 and 19 (first and second arm waveguides), input side lead-out lines 20 and 21 (first and second input side lead-out lines), input side lead-out lines 22 and 23 (first and second input side lead-out lines), phase modulation electrode lines 24, and 25 (first and second phase modulation electrode lines), phase modulation electrode lines 26 and 27 (first and second phase modulation electrode lines), output side lead-out lines 28 and 29 (first and second output side lead-out lines), output side lead-out lines 30 and 31 (first and second output side lead-out lines), electrodes 32 and 33 (first and second electrodes), and electrodes 34 and 35 (first and second electrodes). The 1×2 MMI coupler 11 demultiplexes a light beam propagating through the input waveguide 10 into light beams in two systems. The waveguides 12 and 13 guide the two light beams obtained through the demultiplexing by the 1×2 MMI coupler 11. The 1×2 MMI coupler 14 demultiplexes the light beam propagating through the waveguide 12 into light beams in two systems. The 1×2 MMI coupler 15 demultiplexes the light beam propagating through the waveguide 13 into light beams in two systems. The waveguides 16 and 17 guide the two light beams obtained through the demultiplexing by the 1×2 MMI coupler 14. The waveguides 18 and 19 guide the two light beams obtained through the demultiplexing by the 1×2 MMI coupler 15. The input side lead-out lines 20 and 21 are formed from conductors for applying modulation signals on an in-phase signal (I) side to the respective waveguides 16 and 17. The input side lead-out lines 22 and 23 are formed from conductors for applying modulation signals on a quadrature signal (Q) side to the respective waveguides 18 and 19. The phase modulation electrode lines 24 and 25 are formed from conductors connected to the respective input side lead-out lines 20 and 21. The phase modulation electrode lines 26 and 27 are formed from conductors connected to the respective input side lead-out lines 22 and 23. The output side lead-out lines 28 and 29 are formed from conductors connected to the respective phase modulation electrode lines 24 and 25. The output side lead-out lines 30 and 31 are formed from conductors connected to the respective phase modulation electrode lines 26 and 27. The electrodes 32 and 33 are formed to branch respectively from the phase modulation electrode lines 24 and 25, and are formed from conductors for applying I modulation signals supplied from the phase modulation electrode lines 24 and 25 to the respective waveguides 16 and 17. The electrodes 34 and 35 are formed to branch respectively from the phase modulation electrode lines 26 and 27, and are formed from conductors for applying Q modulation signals supplied from the phase modulation electrode lines 26 and 27 to the respective waveguides 18 and 19.

Furthermore, the IQ modulator includes phase adjustment electrodes 36 to 39 (child electrodes), a 2×1 MMI coupler 40, a 2×1 MMI coupler 41, a waveguide 42, a waveguide 43, a phase adjustment electrodes 44 and 45 (parent electrode), a 2×1 MMI coupler 46, an output waveguide 47, a ground line 48, a ground line 49, a ground line 50, and high frequency termination resistors 51 to 54. The phase adjustment electrodes 36 to 39 are formed from conductors for adjusting respective phases of modulated signal light beams propagating through the waveguides 16 to 19. The 2×1 MMI coupler 40 multiplexes the two systems of signal light beams propagating through the waveguides 16 and 17. The 2×1 MMI coupler 41 multiplexes the two systems of signal light beams propagating through the waveguides 18 and 19. The waveguide 42 guides an output light from the 2×1 MMI coupler 4o. The waveguide 43 guides an output light from the 2×1 MMI coupler 41. The phase adjustment electrodes 44 to 45 are formed from conductors for adjusting respective phases of the signal light beams propagating through the waveguides 42 to 43. The 2×1 MMI coupler 46 multiplexes the two systems of signal light beams propagating through the waveguides 42 and 43. The ground line 48 is formed from a conductor disposed outside the input side lead-out line 20, the phase modulation electrode line 24, and the output side lead-out line 28. The ground line 49 is formed from a conductor disposed between the input side lead-out line 21, the phase modulation electrode line 25, and the output side lead-out line 29, and the input side lead-out line 22, the phase modulation electrode line 26, and the output side lead-out line 3o. The ground line 50 is formed from a conductor disposed outside the input side lead-out line 23, the phase modulation electrode line 27, and the output side lead-out line 31. The high frequency termination resistors 51 to 54 are connected to end portions of the output side lead-out lines 28 to 31, respectively.

The high frequency lines of the IQ modulator in the present embodiment are formed of three portions of a portion of the input side lead-out lines 20 to 23, a portion of the phase modulation electrode lines 24 to 27, and a portion of the output side lead-out lines 28 to 31. The high frequency lines of the IQ modulator in the present embodiment have an impedance matching differential line structure (GSSG configuration) in all the portions described above. If the impedance matching is not made, the signals are reflected at connection portions of the high frequency lines, which leads to the degradation of high frequency characteristics.

In the present embodiment, the high frequency lines have the differential line configuration in all portions, and therefore, the modulator can be driven by a differential input signal (differential driver) with high energy efficiency. In the present embodiment, the high frequency lines, which have the differential line configuration, can achieve smooth high frequency connection even with an open collector type or open drain type differential driver which is used in recent years in terms of low power consumption, thereby achieving both low power consumption and broadband in a compatible manner.

Next, a high frequency line pattern of the present embodiment will be described in further detail. As described above, the high frequency line pattern of the present embodiment has a basic structure as a ground signal ground (GSSG) differential coplanar line in which two signal lines and two ground lines are formed on a dielectric layer made of a low dielectric constant material.

However, in the present embodiment, a semiconductor MZM to which the I modulation signal is input and a semiconductor MZM to which the Q modulation signal is input are provided side by side on the substrate, and the central ground line 49 is shared by the high frequency line pattern of the semiconductor MZM on a side of the I modulation signal and the semiconductor MZM on a side of the Q modulation signal.

An I modulation signal is input to the input side lead-out line 20 from a differential driver (not illustrated) formed on a SI-InP substrate described later, and an I modulation signal (bar I) complementary to the former I modulation signal is input to the input side lead-out line 21 from the differential driver. Similarly, a Q modulation signal is input to the input side lead-out line 22 from the differential driver, and a Q modulation signal (bar Q) complementary to the former Q modulation signal is input to the input side lead-out line 23 from the differential driver.

The end portions of the output side lead-out lines 28 to 31 are terminated by the high frequency termination resistors 51 to 54, respectively. End portions of the high frequency termination resistors 51 to 54 that are not connected to the output side lead-out lines 28 to 31 are grounded or set to have any electrical potentials.

One end (the left end portion in FIG. 1) of each of the ground lines 48 to 50 is connected to the ground of the differential driver.

The 1×2 MMI coupler 14, the waveguides 16 and 17, the input side lead-out lines 20 and 21, the phase modulation electrode lines 24 and 25, the output side lead-out lines 28 and 29, the electrodes 32 and 33, and the 2×1 MMI coupler 40 constitute the semiconductor MZM on the I side. This semiconductor MZM modulates phases of the light beams propagating through the waveguides 16 and 17 in accordance with an I modulation signal applied to the waveguides 16 and 17 from the electrodes 32 and 33.

Similarly, the 1×2 MMI coupler 15, the waveguides 18 and 19, the input side lead-out lines 22 and 23, the phase modulation electrode lines 26 and 27, the output side lead-out lines 30 and 31, the electrodes 34 and 35, and the 2×1 MMI coupler 41 constitute the semiconductor MZM on the Q side. This semiconductor MZM modulates phases of the light beams propagating through the waveguides 18 and 19 in accordance with a Q modulation signal applied to the waveguides 18 and 19 from the electrodes 34 and 35.

The 2×1 MMI coupler 40 multiplexes the modulated signal light beams propagating through the waveguides 16 and 17. The 2×1 MMI coupler 41 multiplexes the modulated signal light beams propagating through the waveguides 18 and 19. The phase adjustment can be made by applying a voltage to the phase adjustment electrodes 44 and 45 such that a phase difference between the signal light on the I side output from the 2×1 MMI coupler 40 and the signal light on the Q side output from the 2×1 MMI coupler 41 is 90 degrees.

The 2×1 MMI coupler 46 multiplexes the signal light on the I side propagating through the waveguide 42 and the signal light on the Q side propagating through the waveguide 43 to obtain a light IQ modulation signal. In this way, the IQ modulator in the present embodiment can be achieved.

Figure 2:
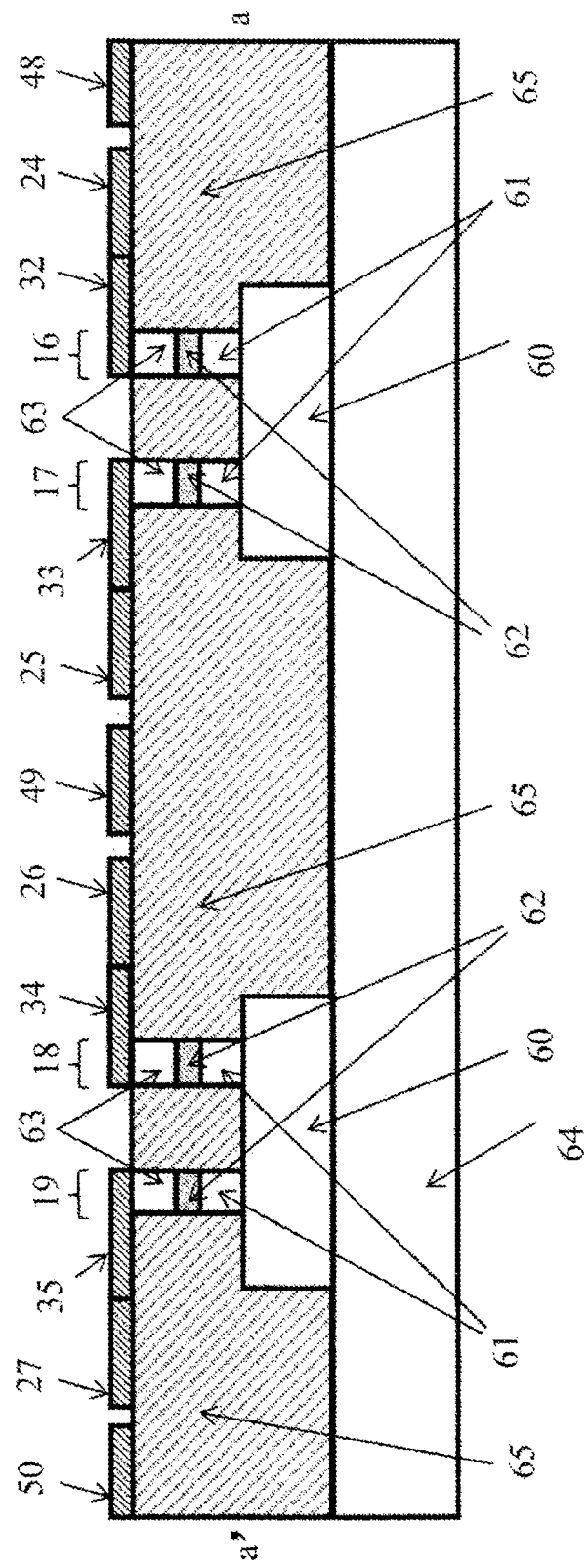
FIG. 2 is a cross-sectional view of a phase modulation portion of the IQ modulator according to the embodiment of the present invention.

FIG. 2 is a cross-sectional view of a phase modulation portion (a region including the electrodes 32 to 35 and the phase modulation electrode lines 24 to 27) of the IQ modulator according to the present embodiment, taken along a line a-a' in FIG. 1. The phase modulation portion has a differential capacitance-loaded structure in which the electrodes 32 to 35 are formed on the waveguides 16 to 19, respectively, to apply the modulation signals to the waveguides 16 to 19. The electrodes 32 to 35 are branched respectively from the phase modulation electrode lines 24 to 27 formed on the dielectric layer and formed into T-shape in a plan view.

The waveguides 16 to 19 of the phase modulation portion are formed in a waveguide structure in which an n-type semiconductor layer (for example, a four-element layer such as n-InP or n-InGaAsP) 60, and a lower clad layer 61, a semiconductor core layer 62, and an upper clad layer 63, each of which is formed of a semiconductor, are layered in this order on the SI-InP substrate 64.

The input side lead-out lines 20 to 23, the phase modulation electrode lines 24 to 27, the output side lead-out lines 28 to 31, and the ground lines 48 to 50 are formed on a dielectric layer 65. In order to reduce losses as high frequency lines, it is preferable that the dielectric layer 65 be made of a low dielectric material such as benzocyclobutene (BCB), for example.

One of the upper clad layer 63 and the lower clad layer 61 may be an n-type semiconductor, and the other may be a p-type semiconductor. A structure may be used in which both the upper clad layer 63 and the lower clad layer 61 are n-type semiconductors, and a third p-type clad layer is inserted between the upper clad layer 63 and the semiconductor core layer 62 or between the lower clad layer 61 and the semiconductor core layer 62.

Next, characteristic configurations of the present embodiment will be described sequentially. First, the phase modulation electrode lines 24 to 27 will be described. The phase modulation electrode lines 24 to 27 are disposed in parallel to the waveguides 16 to 19 that constitute the semiconductor MZM. The phase modulation electrode lines 24 to 27 and the electrodes 32 to 35 connected thereto have a differential capacitance-loaded structure (GSSG configuration) that is excellent in impedance matching and velocity matching of microwaves and light waves.

That is, the phase modulation electrode lines 24 to 27 and the electrodes 32 to 35 connected thereto are configured in such a way that the ground line 48, the phase modulation electrode line 24, the electrode 32, the electrode 33, the phase modulation electrode line 25, the phase modulation electrode line 26, the electrode 34, the electrode 35, the phase modulation electrode line 27, and the ground line 50 are provided side by side. To the phase modulation electrode line 24, an I modulation signal is input. The electrode 32 is supplied with the I modulation signal from the phase modulation electrode line 24. To the electrode 33, a signal (bar I) complementary to the I modulation signal is input. The phase modulation electrode line 25 supplies a signal to the electrode 33. To the phase modulation electrode line 26, a Q modulation signal is input. The electrode 34 is supplied with the Q modulation signal from the phase modulation electrode line 26. To the electrode 35, a signal (bar Q) complementary to the Q modulation signal is input. The phase modulation electrode line 27 supplies a signal to the electrode 35.

The amounts of capacitance to be added to the phase modulation electrode lines 24 to 27 can be freely designed by optimally designing the number, spacings, and lengths of the electrodes 32 to 35 in capacitance loading portions that are branched from the phase modulation electrode lines 24 to 27 serving as main lines and formed at intervals. Thus, the impedances of the phase modulation electrode lines 24 to 27 and the velocities of the microwaves propagating through the phase modulation electrode lines 24 to 27 can be designed to have any values.

Accordingly, the electrode configuration can simultaneously achieve the impedance matching and the velocity matching of the microwaves and the light waves, and can achieve broadband operations for 30 GHz or higher by the modulator. In order to allow the semiconductor MZM to perform a broadband operation, the electrodes 32 to 35 need to be designed to be considered as traveling wave electrodes. Thus, each of intervals of the electrodes 32 to 35 for each signal needs to be ¼ or less, ideally ⅛ or less, of a guide wavelength $\lambda_{eff}$ of the modulation signal of the maximum frequency propagating through the phase modulation electrode lines 24 to 27 and the electrodes 32 to 35.

In order to arrange the respective electrodes 32 to 35 at intervals in a direction in which the waveguides 16 to 19 extend, a Bragg frequency generally needs to be considered as well. Note that, in the present embodiment, because the Bragg frequency is closer to a higher side than the frequency corresponding to the guide wavelength described above is, the Bragg frequency does not need to be considered in a case where the above condition is satisfied where each of the intervals of the electrodes 32 to 35 for each signal is ¼ or less (ideally ⅛ or less) of the guide wavelength $\lambda_{eff}$.

Figure 3:
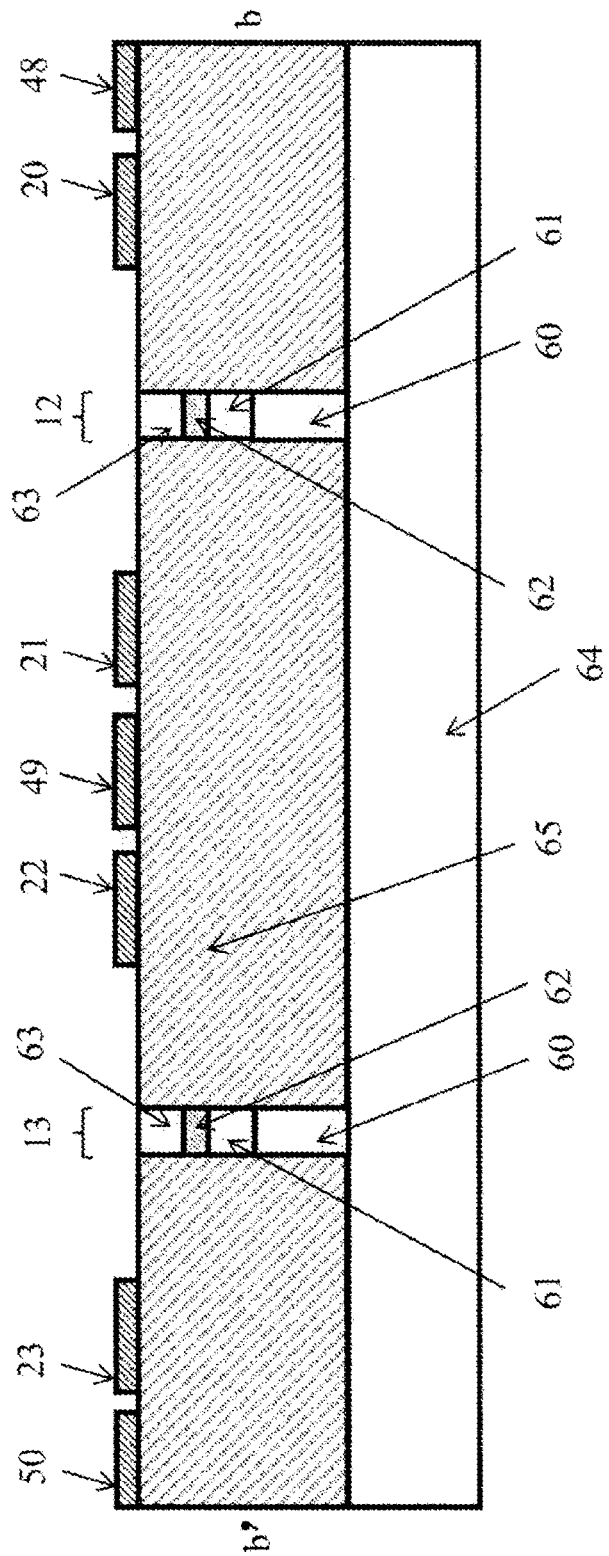
FIG. 3 is a cross-sectional view of a portion of an input side lead-out line of the IQ modulator according to the embodiment of the present invention.

Next, the input side lead-out lines 20 to 23 will be described. FIG. 3 is a cross-sectional view of a portion of the input side lead-out lines 20 to 23 of the IQ modulator according to the present embodiment, taken along a line b-b' in FIG. 1. As can be seen in FIG. 3, the waveguides 10, 12, and 13 and the MMI couplers 11, 14, and 15 are formed in a waveguide structure in which the n-type semiconductor layer 60, the lower clad layer 61, the semiconductor core layer 62, and the upper clad layer 63, which are formed of a semiconductor, are layered in this order on the SI-InP substrate 64. In the input side lead-out lines, it is preferable to minimize the propagation loss for an increase in a band, so a width of the n-type semiconductor layer 60 is preferable to be as small as possible. In other words, in a structure capable of minimizing the loss, the width of the n-type semiconductor layer 60 is the same width as the semiconductor core layer 62 or the clad layers. In the figure, the above described figure is illustrated as an example, but of course, the n-type semiconductor layer 60 may be wider than the semiconductor core layer 62 and the clad layers. However, in that case, the propagation loss increases, and the modulation band degrades.

As described above, the modulation signals are input from the differential driver to the input side lead-out lines 20 to 23. Therefore, a structure capable of smoothly connecting to the differential driver is preferable, and the input side lead-out lines 20 to 23 also need to have a differential line configuration similar to that of the phase modulation electrode lines 24 to 27.

The input side lead-out lines 20 to 23 may have the GSSG configuration, or may have a ground signal ground signal ground (GSGSG) configuration (in which a ground line is further disposed between the input side lead-out lines 20 and 21 and between the input side lead-out lines 22 and 23 in the GSSG configuration). In general, the differential capacitance-loaded structure of the phase modulation portion is often the GSSG configuration, and because the GSSG configuration is also adopted in the present embodiment, the input side lead-out lines 20 to 23 and the output side lead-out lines 28 to 31 are also high frequency lines having the GSSG configuration.

The reason why the input side lead-out lines 20 to 23 and the output side lead-out lines 28 to 31 have the same GSSG configuration as the phase modulation portion is because the loss or the characteristics degradation is involved, which is caused by change in a mode such as change from the GSGSG configuration to the GSSG configuration or change from the GSSG configuration to the GSGSG configuration. If the phase modulation portion has the GSGSG configuration, the input side lead-out lines 20 to 23 and the output side lead-out lines 28 to 31 preferably have the GSGSG configuration.

The input side lead-out lines 20 to 23 are preferably formed on the same lines as the phase modulation electrode lines 24 to 27, respectively. The reason for this is because, when bending occurs in the input side lead-out lines 20 to 23, the high frequency characteristics of the differential mode characteristics degrade, resonance may occur, an in-phase mode may occur, and the like, which may lead to the characteristics degradation.

Because the entire propagation loss in the input side lead-out lines 20 to 23 directly degrades the modulation band (EO band) unlike the propagation loss in the output side lead-out lines 28 to 31, it is important to minimize the propagation loss in the input side lead-out lines 20 to 23 in order to achieve an increase in the band of the modulator. In order to minimize the propagation loss in the input side lead-out lines 20 to 23, it is preferable to have a configuration with no bending, a shortest distance, and little propagation loss. When the input side lead-out lines 20 to 23 is bent, a line length increases and the propagation loss increases compared to a straight high frequency line, and bending loss is further generated, leading to degradation in the high frequency characteristics of a differential signal.

To minimize the propagation loss in the input side lead-out lines 20 to 23, it is preferable, but not necessarily, to form the input side lead-out lines 20 to 23 and the phase modulation electrode lines 24 to 27 on the same straight lines, respectively, as described above.

In the present embodiment, the input waveguide 10 and the 1×2 MMI coupler 11 are formed so that a light propagation direction of the input waveguide 10 (a vertical direction in FIG. 1) and a light input/output direction of the 1×2 MMI coupler 11 (the vertical direction in FIG. 1) are orthogonal to the direction in which the waveguides 16 to 19 extend (a right-left direction in FIG. 1). Furthermore, in the present embodiment, the 1×2 MMI couplers 14, 15, 40, 41, and 46 are formed so that input/output directions of the 1×2 MMI couplers 14, 15, 40, 41, and 46 (the right-left direction in FIG. 1) are the same as the direction in which the waveguides 16 to 19 extend. Thus, in the present embodiment, the lengths of the input side lead-out lines 20 to 23 can be minimized by making the waveguide pattern have an L-shaped layout.

At this time, as to a portion where the input side lead-out lines 20 to 23 intersect with the waveguides 12 and 13, a waveguide structure (semiconductor layer) is present under the input side lead-out lines 20 to 23. Thus, the portion has a different dielectric constant from that of a portion where the dielectric layer 65 is under the input side lead-out lines 20 to 23. Thus, because the impedance mismatching may occur if the input side lead-out lines 20 to 23 have a constant width, it is preferable to take measures such as making the widths of the input side lead-out lines 20 to 23 formed over the waveguide structure narrower than that of the portion of the input side lead-out lines 20 to 23 formed on the dielectric layer 65.

As to the portion where the input side lead-out lines 20 to 23 intersect with the waveguides 12 and 13, a conductor layer is present under the input side lead-out lines 20 to 23. Thus, the propagation loss of the input side lead-out lines 20 to 23 increases, so the arrangement needs to be considered so that the intersection region of the input side lead-out lines 20 to 23 and the waveguides 12 and 13 is minimized. Furthermore, optical designs are also important such as arranging the waveguides 12 and 13 closer to each other, narrowing the width of the MMI, and the like so that an area of the conductor layer is as small as possible.

Figure 4:
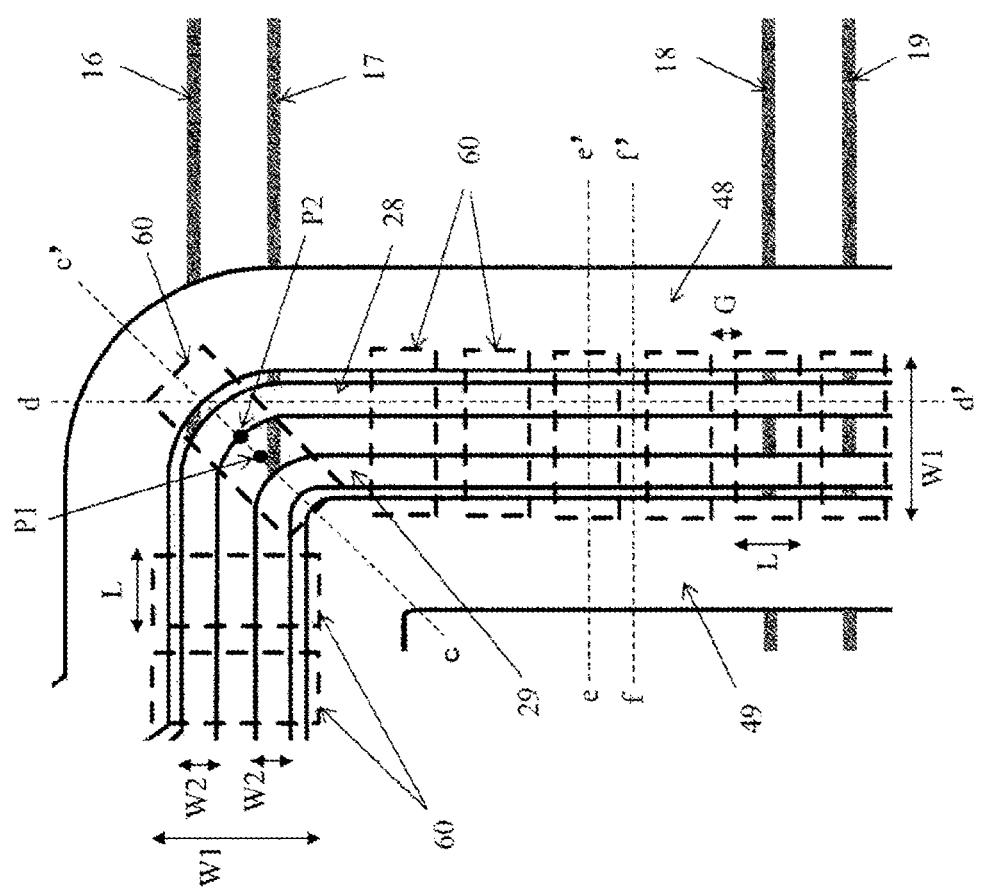
FIG. 4 is an enlarged plan view of a portion of an output side lead-out line of the IQ modulator according to the embodiment of the present invention.
Figure 5:
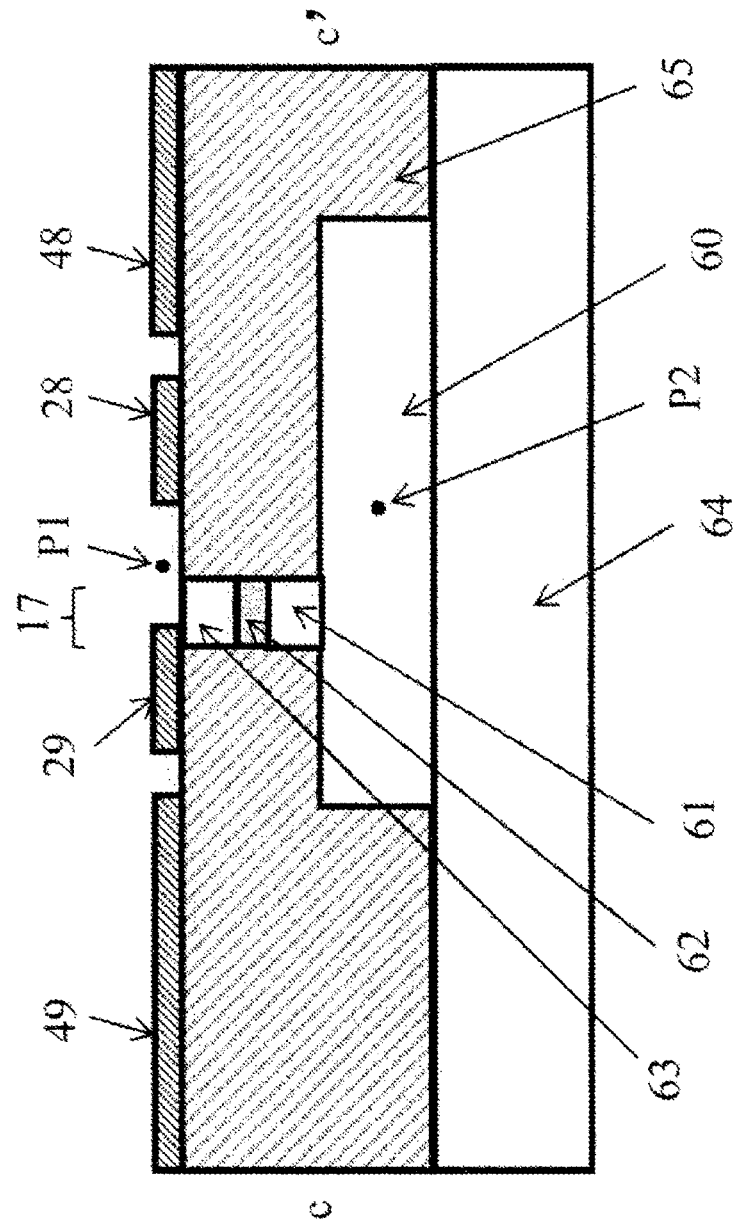
FIG. 5 is a cross-sectional view of a portion of the output side lead-out line of the IQ modulator according to the embodiment of the present invention.
Figure 6:
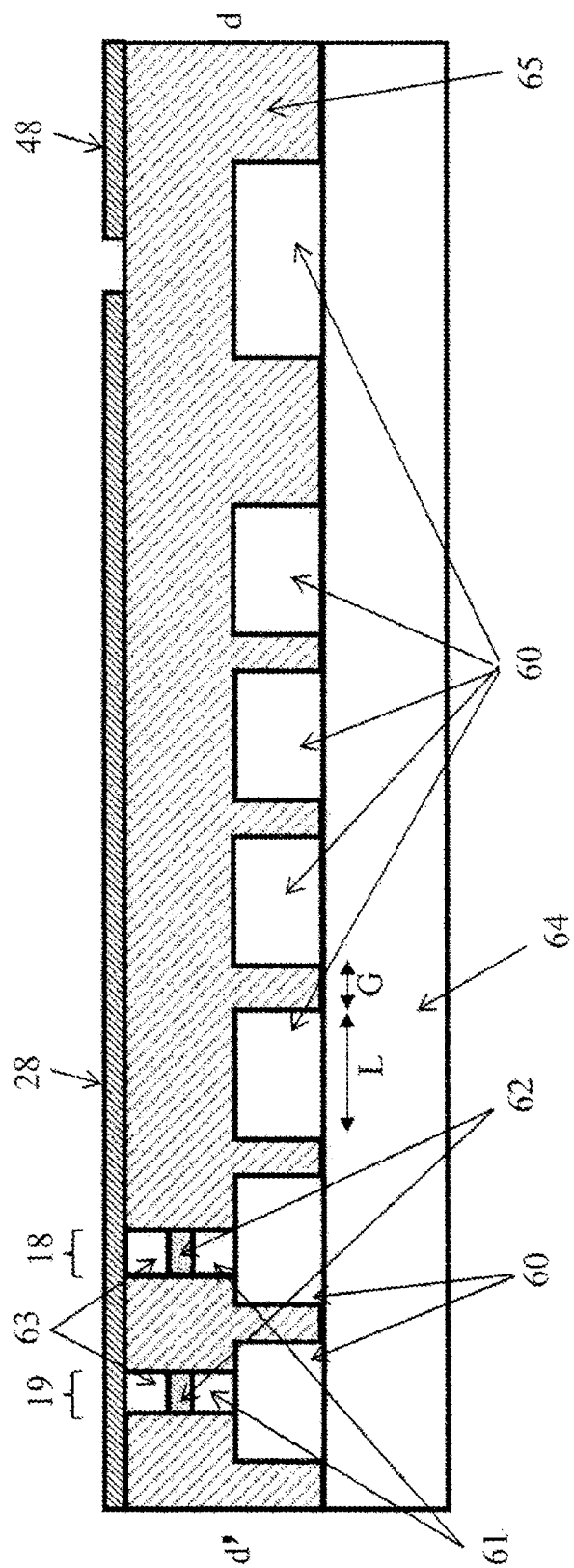
FIG. 6 is a cross-sectional view of a portion of the output side lead-out line of the IQ modulator according to the embodiment of the present invention.

Next, the output side lead-out lines 28 to 31 will be described. FIG. 4 is an enlarged plan view of a portion of the output side lead-out lines 28 to 31. FIG. 5 is a cross-sectional view of the portion of the output side lead-out lines 28 to 31, taken along a line c-c' in FIG. 4. FIG. 6 is a cross-sectional view of the portion of the output side lead-out lines 28 to 31, taken along a line d-d' in FIG. 4. Note that, in FIG. 4, the n-type semiconductor layer 60 (attenuator) in a lower layer is illustrated for the sake of clarity of the configuration of the present embodiment.

As can be seen in FIGS. 5 and 6, the waveguides 16 to 19 in the portions of the output side lead-out lines 28 to 31 are formed in the waveguide structure in which the dielectric layer 65, the lower clad layer 61, the semiconductor core layer 62, and the upper clad layer 63, each of which is formed of a semiconductor, are layered in this order on the SI-InP substrate 64. Note that, a plurality of n-type semiconductor layers 60 are disposed intermittently in a propagation direction of the modulation signals (a lead direction of the output side lead-out lines 28 to 31) directly below the output side lead-out lines 28 to 31.

Thus, in the lower layer under the output side lead-out lines 28 to 31 according to the present embodiment, there are two portions of a portion where the n-type semiconductor layer 60 is present and a portion where no n-type semiconductor layer 60 is present. In the portion where the n-type semiconductor layer 60 is present in the lower layer, the n-type semiconductor layer 60 including, for example, n-InP and n-InGaAsP is formed on the SI-InP substrate 64, the dielectric layer 65 made of, for example, BCB is formed on the n-type semiconductor layer 60, and the output side lead-out lines 28 to 31 are formed on the dielectric layer 65. On the other hand, in the portion where no n-type semiconductor layer 60 is present in the lower layer, the output side lead-out lines 28 to 31 are formed on the dielectric layer 65 formed on the SI-InP substrate 64.

The output side lead-out lines 28 to 31 have a structure configured to be bent in a direction intersecting the direction in which the waveguides 16 to 19 extend (the direction in which the input side lead-out lines 20 to 23 and the phase modulation electrode lines 24 to 27 extend) in a plane of the dielectric layer 65 (a paper face of FIG. 1) and extend to near an edge of a chip.

The reason for this structure is to shorten as much as possible lengths of wires (not illustrated) that connect the end portions of the output side lead-out lines 28 to 31 and a pad of the high frequency termination resistors 51 to 54 external to the chip. In a case of an off-chip termination, the longer the wire, the larger an inductance, which becomes a factor of impedance mismatching, so it is preferable that the wire be short and the inductance is smaller as much as possible. For example, it is preferable to use two or more gold wires, or a wide and low inductance wire such as a wedge bonding wire or a ribbon bonding wire.

Assuming the wire bonding, it is desirable to have the configuration as in the present embodiment in which the output side lead-out lines 28 to 31 are bent in the direction intersecting the direction in which the waveguides 16 to 19 extend, and the output side lead-out lines 28 to 31 extend to near the edge of the chip. However, this does not apply to the case for a flip-chip termination in which a terminal substrate having the high frequency termination resistors 51 to 54 formed thereon is flip-chip mounted on the output side lead-out lines 28 to 31. In the case of the flip-chip termination, any portion on the chip can be connected to the high frequency termination resistors 51 to 54, and thus, the output side lead-out lines 28 to 31 need not be configured to be bent, and only a straight pattern may be used.

Next, the effect of the n-type semiconductor layer 60, which is a feature of embodiments of the present invention, will be described. In the case where no n-type semiconductor layer 60 is present, no conductor layer is present in the lower layer under the high frequency line, that is, ideally, a ground in the lower layer is not present. On the other hand, in the case where the n-type semiconductor layer 60 is present, the n-type semiconductor layer 60 acts as a ground in the lower layer under the high frequency line, so the high frequency line is a grounded coplanar line. When the high frequency line is designed with any impedance, the width of the high frequency line in the case where the n-type semiconductor layer 60 is present in the lower layer is thinner to approximately ½ than that in the case where no n-type semiconductor layer 60 is present in the lower layer, owing to the effect of the ground.

In addition, because the n-type semiconductor layer 60 has a resistivity compared to an ideal metal ground, a propagation loss occurs in the high frequency line due to the n-type semiconductor layer 60. In a case a p-type semiconductor is applied instead of the n-type semiconductor, the propagation loss tends to further increase.

Note that, in terms of the configuration of the capacitance-loaded structure, a bias voltage must be applied to drive the modulator via the conductor layer (n-type semiconductor layer 60) in the lower layer. If a p-type semiconductor is selected as the conductor layer in the lower layer, a voltage drop is generated due to a high resistivity of the p-type semiconductor, which is not preferable because a desired voltage cannot be supplied over a wide range.

In this way, the propagation loss in the output side lead-out lines 28 to 31 can be increased by newly providing, in the region where the output side lead-out lines 28 to 31 are formed, the n-type semiconductor layer 60 that does not contribute to the phase modulation and is ordinarily unnecessary. If the n-type semiconductor layer 60 is provided in a region other than the phase modulation electrode lines 24 to 27 and the output side lead-out lines 28 to 31, the propagation loss increases to serve as nothing but a cause of the degradation of the modulation band of the modulator. However, because the output side lead-out lines 28 to 31 are the high frequency lines after the phase modulation, even the increase in the propagation loss does not affect the modulation band and the modulation characteristics of the modulator.

The increase in the propagation loss in the output side lead-out lines 28 to 31 exerts an effect in a case where the impedance mismatching occurs between the output side lead-out lines 28 to 31 and the high frequency termination resistors 51 to 54. In general, in a case where a high frequency signal cannot be completely terminated between the output side lead-out lines 28 to 31 and the high frequency termination resistors 51 to 54, a reflection wave occurs, and the reflection wave, via the output side lead-out lines 28 to 31, reaches the phase modulation electrode lines 24 to 27, furthermore the input side lead-out lines 20 to 23, and driver ends ahead of these lines. Such effect of the reflection tends to degrade the original modulation signals, which leads to the degradation of the modulation characteristics of the modulator.

Furthermore, in the case where the driver is the open collector type or open drain type driver, the output end of the driver is an open end, so total reflection occurs and the reflection wave returns to the high frequency termination resistors 51 to 54 side. If the reflection wave is generated in this manner and eventually becomes multiple reflection, a waviness (periodic resonance)/ripple occurs in the electro-optic (EO) characteristics, significantly degrading the modulation characteristics of the modulator.

However, in a case where the propagation loss in the output side lead-out lines 28 to 31 is large as in the present embodiment, the effect of reflection can be greatly suppressed. The reason why the effect of the reflection can be suppressed is because if the modulation signals after passing through the phase modulation electrode lines 24 to 27 and completing contributing to the phase modulation are weakened due to the large loss in the output side lead-out lines 28 to 31, there is no signal returning in the direction of the phase modulation electrode lines 24 to 27 even if the impedance mismatching occurs between the output side lead-out lines 28 to 31 and the high frequency termination resistors 51 to 54.

For this reason, it is preferable that the propagation loss in the output side lead-out lines 28 to 31 be as large as possible, and thus, the n-type semiconductor layer and the p-type semiconductor layer in combination, or the p-type semiconductor layer may be used as the conductor layer (attenuator) in the lower layer under the output side lead-out lines 28 to 31. However, it is not preferable to employ a pin structure similar to that of the waveguide portion, for example. The reason for this is because in the case of the pin structure, if capacitive characteristics are sensed in an i layer portion, the bias voltage cannot be applied to the n-type semiconductor, so a capacitance value of the semiconductor determined from a depletion layer cannot be stably controlled, possibly resulting in unstable characteristics.

Because the n-type semiconductor layer 60 is the conductor layer for applying the bias voltage of the phase modulation portion as described above, it is preferable that the n-type semiconductor layer 60 include n-InGaAsP or n-InP having a carrier concentration of $1 \times 10^{18}$ cm$^{-3}$ or greater so that the voltage drop does not occur. The n-type semiconductor layer 60 may include one layer, or may include two or more layers combining n-InP and n-InGaAsP, for example, and a thickness is preferably 0.2 μm or greater. Note that, if the n-type semiconductor layer 60 is too thick, the high frequency lines disposed on the dielectric layer 65 on the n-type semiconductor layer 60 are too close to the n-type semiconductor layer 60, so the dielectric layer 65 needs to be thickened if the n-type semiconductor layer 60 is thick.

For example, in consideration of the degree of freedom of the impedance design, the thickness of the dielectric layer 65 is preferably at least 4 μm or greater, and for example, the low dielectric constant material such as polyimide or BCB of an organic material is preferably used for the material of the dielectric layer 65. The thickness of the dielectric layer 65 less than 4 μm is not preferable because a distance from the high frequency lines to the n-type semiconductor layer 60 is too close and the width of the high frequency lines for achieving the desired impedance becomes small, leading to weakness in manufacturing variation to make it difficult to manufacture high frequency lines with stable impedance. A semiconductor layer may be used as the dielectric layer 65, but the width of the high frequency line is too small because the dielectric constant of the semiconductor is high, which is not preferable in consideration of the stability of the impedance.

Next, a pattern design rule for the portions where the n-type semiconductor layer 60 is present and not present will be described. One measure is considered in which the n-type semiconductor layer 60 of a large area is provided over the entire region where the output side lead-out lines 28 to 31 are formed. However, in this case, there occurs a risk that the modulation signal propagating through the output side lead-out lines 28 to 31 resonate in the n-type semiconductor layer 60. The larger the area of the n-type semiconductor layer 60, the lower a resonant frequency of the n-type semiconductor layer 60, and thus, in the frequency band used by the modulator, a ripple due to resonance is to occur in the EO characteristics. Accordingly, the configuration in which the n-type semiconductor layer 60 is formed over the entire region cannot be applied to the broadband modulator.

First, it is desirable to consider the guide wavelength of the maximum frequency in a band of the modulation signal propagating through each high frequency line. When comparing the portion where the n-type semiconductor layer 60 is present and the portion where no n-type semiconductor layer 60 is present, an effective refractive index is higher in the portion where the n-type semiconductor layer 60 is present. Thus, the guide wavelength of the portion where the n-type semiconductor layer 60 is present is considered as a basis.

In the present embodiment, the portion where no n-type semiconductor layer 60 is present is within a length of ¼ or less of the guide wavelength. In other words, as illustrated in FIGS. 4 to 6, a plurality of n-type semiconductor layers 60 are disposed in the propagation direction of the modulation signal (the lead direction of the output side lead-out lines 28 to 31), but a length L of each n-type semiconductor layer 60 in the propagation direction is ¼ or less of the guide wavelength of the maximum frequency in the bands of the modulation signals.

For a portion where the waveguide is present, the n-type semiconductor layers 60 cannot be completely separated because of the presence of the waveguide, but are desirable to be separated in portions other than the waveguide portion. Specifically, for example, assuming that up to 50 GHz is the desirable modulation signal frequency and that the effective refractive index is 2.5, ¼ of the guide wavelength is 0.6 mm, and thus, the length L of each n-type semiconductor layer 60 in the propagation direction needs to be 0.6 mm or less. Similarly, a width W1 of the n-type semiconductor layer 60 in the direction perpendicular to the propagation direction of the modulation signals is preferably ¼ or less of the guide wavelength.

In this way, by setting the length L and the width W1 of the n-type semiconductor layer 60, resonance of the n-type semiconductor layer 60 within the frequency band in use can be avoided.

Note that the length L and the width W1 of the n-type semiconductor layer 60 are desired to be ¼ or less of the guide wavelength as described above, ideally less than ¼, and further preferably ⅛ or less, for example.

Figure 7:
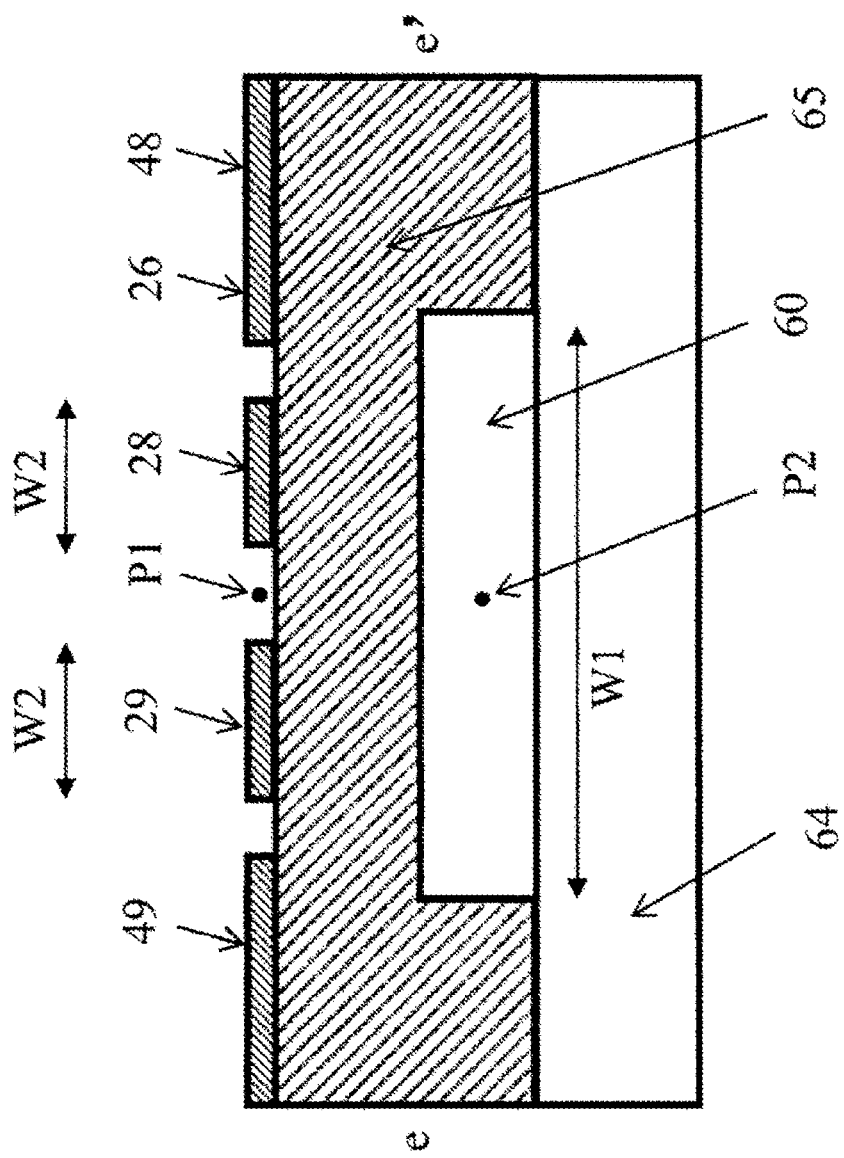
FIG. 7 is a cross-sectional view of a portion of the output side lead-out line of the IQ modulator according to the embodiment of the present invention.
Figure 8:
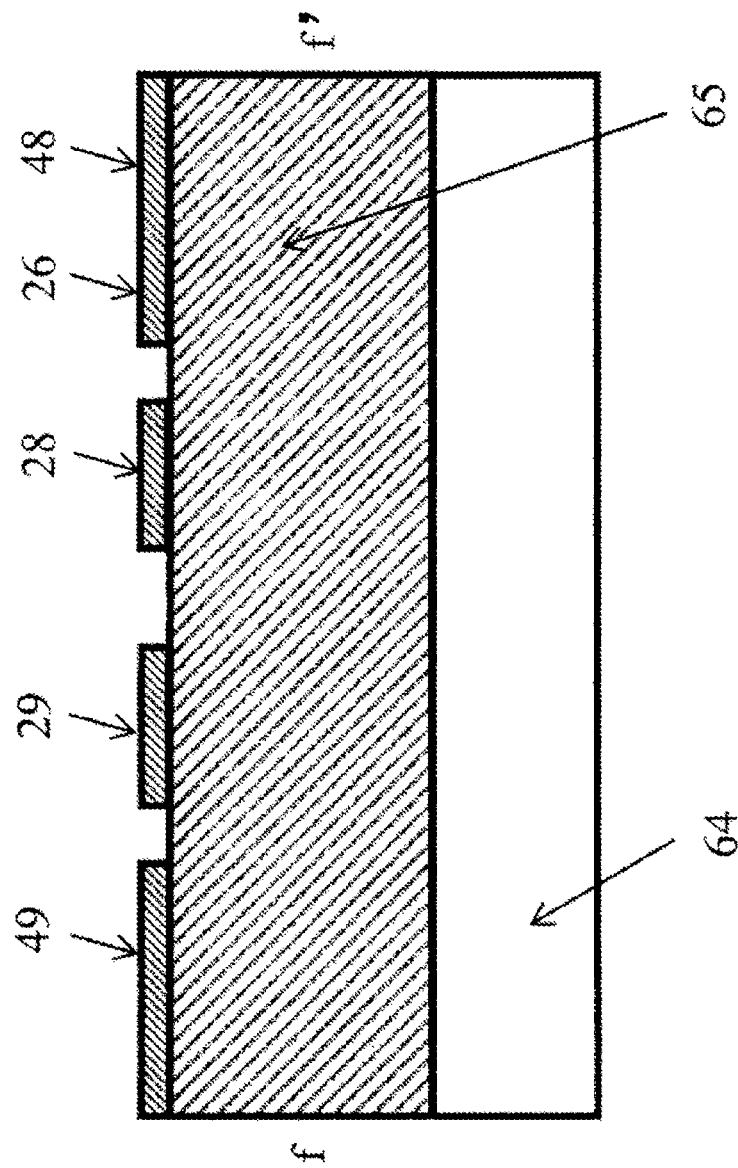
FIG. 8 is a cross-sectional view of a portion of the output side lead-out line of the IQ modulator according to the embodiment of the present invention.

Furthermore, the width W1 of the n-type semiconductor layer 60 in the direction perpendicular to the propagation direction of the modulation signals is preferably ¼ or less of the guide wavelength and equal to or more than a distance between the ground line 48 and the ground line 49 (between the ground line 49 and the ground line 50) as illustrated in FIG. 4. In other words, the n-type semiconductor layer 60 is present below edges of the ground lines 48 to 50 on the output side lead-out line side. FIG. 7 illustrates a cross-sectional view of the output side lead-out lines 28 and 29, the ground lines 48 and 49, and the n-type semiconductor layer 60 illustrated in FIG. 4 taken along a line e-e', and FIG. 8 illustrates a cross-sectional view taken along a line f-f.

The reason for setting the width W1 of the n-type semiconductor layer 60 to be equal to or more than the distance between the ground line 48 and the ground line 49 (between the ground line 49 and the ground line 50) is because the mode is unstable if no n-type semiconductor layer 60 is present in the middle in consideration of an electric field distribution of a propagating electromagnetic waves. Another reason is because if the width W1 of the n-type semiconductor layer 60 is set as described above, the propagation loss can be increased not only in the differential mode but also in the in-phase mode.

In terms of the electric field instability, in a straight portion of the output side lead-out lines 28 to 31, it is preferable that a position of a midpoint P1 between two adjacent output side lead-out lines 28 and 29 (a midpoint between the output side lead-out lines 30 and 31) in the direction perpendicular to the propagation direction of the modulation signals (the right-left direction in FIG. 7) match a position of a center point P2 of the n-type semiconductor layer 60 in the direction perpendicular to the propagation direction. The n-type semiconductor layer 60 has a cross-section that is bilaterally symmetric with respect to a perpendicular line in a thickness direction passing through the center point P2 (vertical direction in FIG. 7).

However, this does not apply to the bent portion of the output side lead-out lines 28 to 31 (denoted by 70 and 71 in FIG. 1). As illustrated in FIG. 4, in the bent portion of the output side lead-out lines 28 to 31, the mode expands toward an outer peripheral side, and thus, it is preferable that, as illustrated in FIG. 5, the center point P2 of the n-type semiconductor layer 60 be shifted to the outer peripheral side of the bent portion of the output side lead-out lines 28 to 31 with respect to the midpoint P1 between two adjacent output side lead-out lines 28 and 29 (the midpoint between the output side lead-out lines 30 and 31). By shifting the center point P2 of the n-type semiconductor layer 60 to the outer peripheral side, the n-type semiconductor layer 60 of the bent portion of the output side lead-out lines 28 to 31 can be prevented from contacting the adjacent n-type semiconductor layers 60.

A gap G between the n-type semiconductor layers 60 in the propagation direction of the modulation signals may be an arbitrary gap. Note that the gap is preferably at least 5 μm or more also in consideration of photo precision and the like, although depending on whether wet etching or dry etching is used as a process for separating the n-type semiconductor layer 60. Conversely, the gap G between the n-type semiconductor layers 60 being too long means that an area of the n-type semiconductor layer 60 decreases. Accordingly, even in consideration of process variation, the gap G between the n-type semiconductor layers 60 in the propagation direction of the modulation signals is preferably 50 μm or less.

Additionally, the width of the high frequency lines for achieving the desired impedance differs depending on the presence or absence of the n-type semiconductor layer 60. For this reason, a width W2 of each of the output side lead-out lines 28 to 31 in the direction perpendicular to the propagation direction of the modulation signals is preferably changed to be optimized for each part depending on the presence or absence of the n-type semiconductor layer 60 in consideration of the impedance matching of the part.

Specifically, in a case where the width W2 of each of the output side lead-out lines 28 to 31 is designed so that the desired impedance can be achieved at the portion of the output side lead-out lines 28 to 31 directly under which the n-type semiconductor layer 60 is present, it is only required that the width W2 in the portion of the output side lead-out lines 28 to 31 directly under which no n-type semiconductor layer 60 is present be wider than that of the portion immediately under which the n-type semiconductor layer 60 is present.

However, in a case where the gap between the n-type semiconductor layers 60 in the propagation direction of the modulation signals is short (for example, 5 μm or the like) enough to not affect the high frequency characteristics in the frequency band used by the modulator, the width W2 of each of the output side lead-out lines 28 to 31 may be constant. FIG. 1 illustrates the example in which the width W2 of each of the output side lead-out lines 28 to 31 is constant.

Next, the bent portion of the output side lead-out lines 28 to 31 will be described. For the design of the bent portion, the presence of the n-type semiconductor layer 60 in the lower layer also exhibits an effect. For example, in the case where no n-type semiconductor layer 60 is present in the lower layer, because the output side lead-out lines 28 to 31 each having a wide line width are formed on a low dielectric medium, bending the output side lead-out lines 28 to 31 without changing the wide line widths causes an electrical length difference in the signal between two output side lead-out lines 28 and 29 and between the output side lead-out lines 30 and the 31 having the differential configurations, thereby generating a large phase difference. Due to the phase difference and the asymmetry of the bending, differential line characteristics may be broken, and an in-phase mode that becomes noise may occur.

Accordingly, the phase difference in the signal between the two output side lead-out lines 28 and 29 (between the output side lead-out lines 30 and 31) needs to be minimized, so the width of each of the output side lead-out lines 28 to 31 needs to be narrowed. In a case where the width of each of the output side lead-out lines 28 to 31 is narrowed in order to prioritize the differential line characteristics and to allow the phase difference to fall within an acceptable range, bending the lines with the impedance completely matched is difficult, thereby generating a little impedance mismatching point.

On the other hand, if the n-type semiconductor layer 60 is present in the lower layer as in the present embodiment, the width W2 of each of the output side lead-out lines 28 to 31 can be narrower than the width of each of the input side lead-out lines 20 to 23 and the phase modulation electrode lines 24 to 27 even with the same impedance. Thus, bending of the output side lead-out lines 28 to 31 can be achieved while the impedance matching is maintained. Although there are also portions where no n-type semiconductor layer 60 is present because of the separation of the n-type semiconductor layers 60, if the gap G between the n-type semiconductor layers 60 is sufficiently small, about 10 μm, as described above, the effect of the impedance mismatching is not caused.

As described above, in the present embodiment, the output side lead-out lines 28 to 31 in the straight portion may be formed to have the constant width W2 corresponding to the desired impedance, and the width of each of the output side lead-out lines 28 to 31 in the bent portion may be narrower than the constant width W2. Further, in the example of FIG. 1, the distance between the output side lead-out line 28 and the ground line 48, the distance between the output side lead-out line 29 and the ground line 49, the distance between the output side lead-out line 30 and the ground line 49, and the distance between the output side lead-out line 31 and the ground line 50 are always constant, but the distance between the output side lead-out line and the ground line in the bent portion may be shorter than the distance between the output side lead-out line and the ground line in the straight portion.

In this way, in the present embodiment, by narrowing the width of each of the output side lead-out lines 28 to 31 in the bent portion, the electrical length difference and phase difference between the output side lead-out lines 28 and 29 and the electrical length difference and phase difference between the output side lead-out lines 30 and 31 can be sufficiently reduced so that the degradation in the in-phase mode and a mixed mode can be suppressed.

Furthermore, a clothoid curve can be employed as a locus of the edge of the bent portion of the output side lead-out lines 28 to 31 to further improve the characteristics. Employing the clothoid curve can improve, for example, differential reflection characteristics (Sdd11) by a few decibels compared to normal curves.

Figure 9:
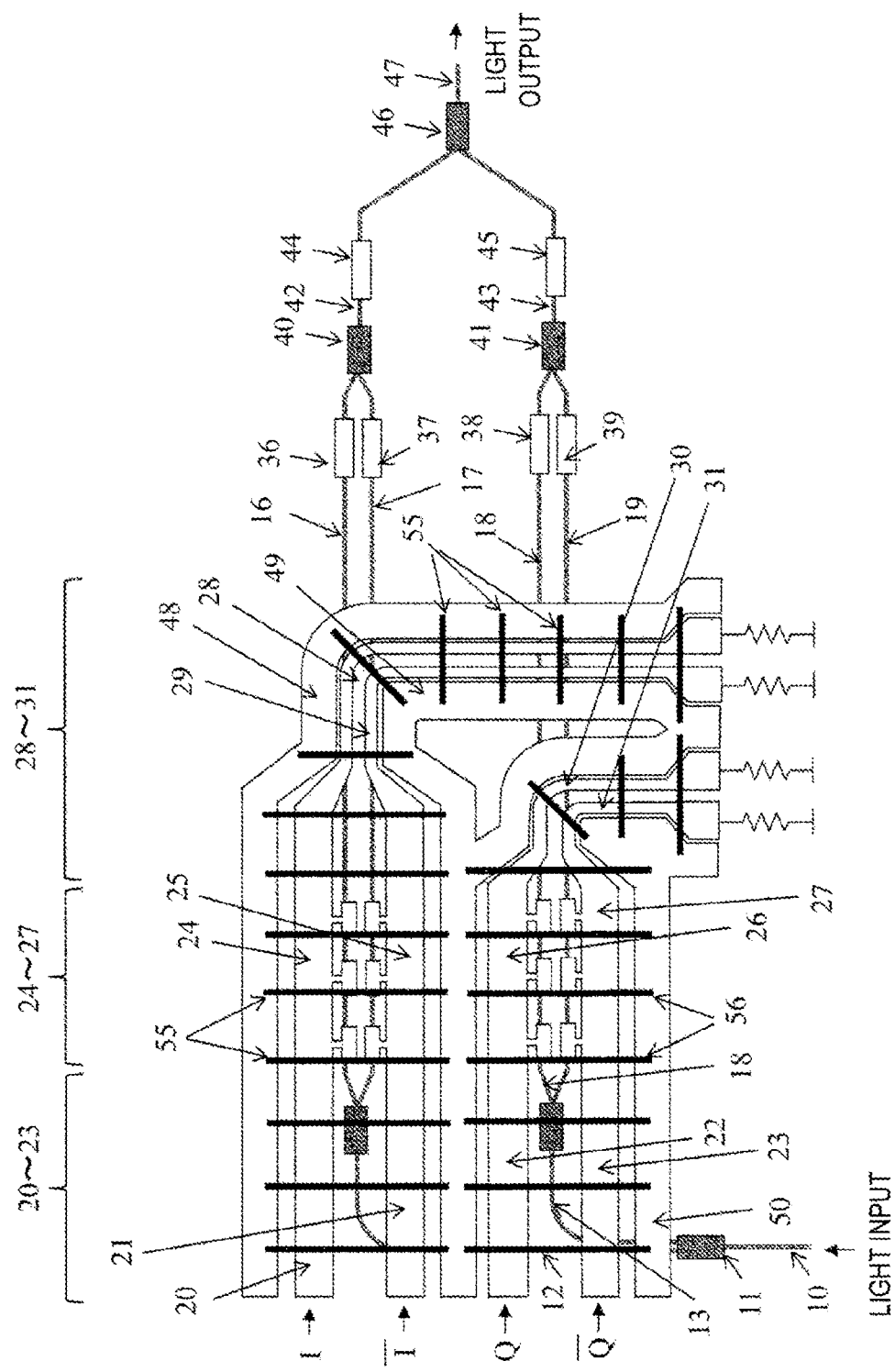
FIG. 9 is a plan view illustrating wires connecting ground lines according to the embodiment of the present invention.

As illustrated in FIG. 9, it is preferable in practice to provide wires 55 and 56 that electrically connect between the ground lines 48 to 50. In a case where there are no wires 55 and 56 between the ground lines, the potentials of the ground lines 48 to 50 are not stabilized but fluctuate, so resonance occurs at any frequency that depends on a propagation length. As a result, the wide band modulator is difficult to achieve. To suppress this resonance, it is preferable to provide the wires 55 and 56 that connect between the ground lines 48 to 50 at intervals short enough for a modulation signal wavelength in the propagation direction of the modulation signals, specifically at intervals of ¼ or less, or ⅛ or less, if possible, of the guide wavelength described above.

By providing the wires 55 and 56, the potentials of the ground lines 48 to 50 on both sides of the input side lead-out lines 20 to 23, the phase modulation electrode lines 24 to 27, and the output side lead-out lines 28 to 31 can be stabilized, so that the resonance of the potentials of the ground lines 48 to 50 can be suppressed to achieve the broadband modulator. In a case where the wires 55 and 56 are provided at intervals longer than ¼ to ⅛ of the guide wavelength λ, the amount of ripple can be reduced, but the resonance of the potentials of the ground lines 48 to 50 cannot be completely suppressed.

Because the guide wavelengths in the portion of the input side lead-out lines 20 to 23, the portion of the phase modulation electrode lines 24 to 27, and the portion of the output side lead-out lines 28 to 31 are different from each other, the intervals of the wires 55 and 56 are not necessarily the same in all the portions, and the intervals of the wires 55 and 56 suitable for each portion are preferably selected.

It is also possible to stabilize the potentials of the ground lines 48 to 50 by connecting between the ground lines 48 to 50, not through the wires 55 and 56, but through ground electrodes provided on a back surface of the semiconductor substrate (the SI-InP substrate 64) and ground vias fabricated by processing the semiconductor substrate. However, in this case, in the output side lead-out lines 28 to 31 having the bent portion, a substrate resonance may be generated in a frequency range required for the broadband operation due to the effect of the ground electrode formed on the back surface of the semiconductor substrate, so it is not preferable to use the ground electrode on the back surface of the semiconductor substrate.

Note that in the first and second embodiments, the waveguides 16 to 19 of the modulator have the structure in which the lower clad layer 61 made of InP, the non-doped semiconductor core layer 62, and the upper clad layer 63 made of InP are sequentially layered on the SI-InP substrate 64. Other waveguides 10, 12, 13, 42, 43, and 47 are similarly configured.

The semiconductor core layer 62 functions as an optical waveguide layer and is made of a material such as InGaAsP and InGaAlAs, for example. It is only required that the semiconductor core layer 62 be formed of a bulk layer of quaternary mixed crystal or a multiple-quantum well layer having a single composition. A structure in which an optical confinement layer having a band gap that is larger than that of the multiple-quantum well layer and smaller than that of each of the lower clad layer 61 and the upper clad layer 63 is formed over and under the multiple-quantum well layer may be used as the semiconductor core layer 62. A band gap wavelength of the bulk layer of quaternary mixed crystal or the multiple-quantum well layer is set such that the electrooptic effect effectively acts in an optical wavelength to be used and light absorption is not problematic.

The present invention is not limited to the InP based material, and, for example, a material system compatible with the GaAs substrate may be used.

In the first and second embodiments, the n-type semiconductor layer or the p-type semiconductor layer is disposed, as the attenuator for attenuating the modulation signals, in the lower layer under the output side lead-out lines 28 to 31. However, the present invention is not limited thereto, and the attenuator may be disposed in an upper layer over the output side lead-out lines 28 to 31 (for example, directly above the output side lead-out lines 28 to 31).

INDUSTRIAL APPLICABILITY

Embodiments of the present invention can be applied to a semiconductor Mach-Zehnder optical modulator that modulates an optical signal with an electrical signal.

REFERENCE SIGNS LIST

10 Input waveguide
11, 14, 15 1×2 MMI coupler
12, 13, 16 to 19 Waveguide
20 to 23 Input side lead-out line
24 to 27 Phase modulation electrode line
28 to 31 Output side lead-out line
32 to 35 Electrode
36 to 39, 44, 45 Phase adjustment electrode
40, 41, 46 2×1 MMI coupler
47 Output waveguide
48 to 50 Ground line
51 to 54 High frequency termination resistor
55, 56 Wire
60 n-type semiconductor layer
61 Lower clad layer
62 Semiconductor core layer
63 Upper clad layer
64 SI-InP substrate
65 Dielectric layer.

The invention claimed is:

1. A semiconductor Mach-Zehnder optical modulator comprising:
   an optical waveguide formed on a substrate;
   a dielectric layer on the substrate;
   an input side lead-out line on the dielectric layer, the input side lead-out line including a first end to which a modulation signal is input;
   a phase modulation electrode line on the dielectric layer along the optical waveguide, the phase modulation electrode line including a first end connected to a second end of the input side lead-out line;
   an output side lead-out line on the dielectric layer, the output side lead-out line including a first end connected to a second end of the phase modulation electrode line;
   an electrode configured to apply a modulation signal to the optical waveguide, the modulation signal propagating through the phase modulation electrode line; and
   an attenuator configured to attenuate the modulation signal and arranged directly below the output side lead-out line or directly above the output side lead-out line.

2. A semiconductor Mach-Zehnder optical modulator, comprising:
   an optical waveguide formed on a substrate;
   a dielectric layer on the substrate;
   an input side lead-out line on the dielectric layer, the input side lead-out line including a first end to which a modulation signal is input;
   a phase modulation electrode line on the dielectric layer along the optical waveguide, the phase modulation electrode line including a first end connected to a second end of the input side lead-out line;
   an output side lead-out line on the dielectric layer, the output side lead-out line including a first end connected to a second end of the phase modulation electrode line;
   an electrode configured to apply a modulation signal to the optical waveguide, the modulation signal propagating through the phase modulation electrode line; and
   an attenuator configured to attenuate the modulation signal in a lower layer under the output side lead-out line or an upper layer over the output side lead-out line, wherein the attenuator includes at least one semiconductor layer that is disposed intermittently along the output side lead-out line in the lower layer under the output side lead-out line, the at least one semiconductor layer being n-type or p-type.

3. The semiconductor Mach-Zehnder optical modulator according to claim 2, wherein:
the attenuator includes a plurality of semiconductor layers;
in a portion of the output side lead-out line, a length of each of the plurality of semiconductor layers in a propagation direction of the modulation signal is ¼ or less of a guide wavelength of a maximum frequency in a band of the modulation signal;
a width of the plurality of semiconductor layers in a direction perpendicular to the propagation direction of the modulation signal is ¼ or less of the guide wavelength; and
a gap between the plurality of semiconductor layers in the propagation direction of the modulation signal is 50 µm or less.

4. The semiconductor Mach-Zehnder optical modulator according to claim 2, wherein:
the optical waveguide includes a first arm waveguide and a second arm waveguide;
the input side lead-out line includes a first input side lead-out line and a second input side lead-out line, the first input side lead-out line including a first end to which a modulation signal is input, the second input side lead-out line being on the dielectric layer adjacent to the first input side lead-out line and including a first end to which a signal complementary to the modulation signal is input;
the phase modulation electrode line includes a first phase modulation electrode line and second phase modulation electrode line on the dielectric layer along the respective first and second arm waveguides, the first and second phase modulation electrode lines including first ends connected to respective second ends of the first and second input side lead-out lines;
the output side lead-out line includes first and second output side lead-out lines, the first and second output side lead-out lines including first ends connected to respective second ends of the first and second phase modulation electrode lines; and
the electrode includes a first electrode and a second electrode configured to apply respective modulation signals to the first and second arm waveguides, the respective modulation signals propagating through the first and second phase modulation electrode lines.

5. The semiconductor Mach-Zehnder optical modulator according to claim 4, further comprising:
a first ground line along a propagation direction of the modulation signal on the dielectric layer outside the first input side lead-out line, the first phase modulation electrode line, and the first output side lead-out line; and
a second ground line along the propagation direction of the modulation signal on the dielectric layer outside the second input side lead-out line, the second phase modulation electrode line, and the second output side lead-out line, wherein:
in a portion of the first and second output side lead-out lines, a width of the at least one semiconductor layer in a direction perpendicular to the propagation direction of the modulation signal is equal to or more than a distance between the first and second ground lines, and
the at least one semiconductor layer is disposed below edges of the first and second ground lines, the edges of the first and second ground lines being closer to respective output side lead-out lines than other edges of the first and second ground lines.

6. The semiconductor Mach-Zehnder optical modulator according to claim 4, wherein in a straight portion of the first and second output side lead-out lines, the at least one semiconductor layer is disposed such that a position of a midpoint between the first and second output side lead-out lines in a direction perpendicular to a propagation direction of the modulation signal matches a position of a center point of the at least one semiconductor layer in the direction perpendicular to the propagation direction of the modulation signal, and the at least one semiconductor layer has a cross-section that is bilaterally symmetric with respect to a perpendicular line in a thickness direction passing through the center point.

7. The semiconductor Mach-Zehnder optical modulator according to claim 4, wherein:
the first and second output side lead-out lines are bent in a direction intersecting a direction in which the first and second arm waveguides extend in a plane of the dielectric layer, and
in a bent portion of the first and second output side lead-out lines, the at least one semiconductor layer is disposed such that a center point of the at least one semiconductor layer in the direction perpendicular to a propagation direction of the modulation signal is disposed at an outer peripheral side of the bent portion of the first and second output side lead-out lines with respect to a midpoint between the first and second output side lead-out lines in the direction perpendicular to the propagation direction of the modulation signal.

8. The semiconductor Mach-Zehnder optical modulator according to claim 4,
wherein a line width of each of the first and second output side lead-out lines in a direction perpendicular to a propagation direction of the modulation signal is wider in a portion immediately under which the at least one semiconductor layer is not present than in a portion immediately under which the at least one semiconductor layer is present.

9. The semiconductor Mach-Zehnder optical modulator according to claim 4, further comprising:
a first ground line along a propagation direction of the modulation signal on the dielectric layer outside the first input side lead-out line, the first phase modulation electrode line, and the first output side lead-out line; and
a second ground line along the propagation direction of the modulation signal on the dielectric layer outside the second input side lead-out line, the second phase modulation electrode line, and the second output side lead-out line, wherein:
the first and second output side lead-out lines are bent in a direction intersecting a direction in which the first and second arm waveguides extend in a plane of the dielectric layer and each have a line width shorter in a bent portion than in a straight portion in the direction perpendicular to the propagation direction of the modulation signal; and
the first and second ground lines are bent along the first and second output side lead-out lines and each have a shorter inter-line distance to a corresponding one of the first and second output side lead-out lines in the bent portion than in the straight portion.

10. The semiconductor Mach-Zehnder optical modulator according to claim 4, further comprising:
- a first ground line along a propagation direction of the modulation signal on the dielectric layer outside the first input side lead-out line, the first phase modulation electrode line, and the first output side lead-out line;
- a second ground line along the propagation direction of the modulation signal on the dielectric layer outside the second input side lead-out line, the second phase modulation electrode line, and the second output side lead-out line; and
- a plurality of wires electrically connecting between the first and second ground lines, wherein the plurality of wires are disposed at intervals of ¼ or less of a guide wavelength of a maximum frequency in a band of the modulation signal.

11. The semiconductor Mach-Zehnder optical modulator according to claim 1, wherein the attenuator includes at least one semiconductor layer that is disposed intermittently along the output side lead-out line in a lower layer under the output side lead-out line, the at least one semiconductor layer being n-type or p-type.

12. The semiconductor Mach-Zehnder optical modulator according to claim 11, wherein:
- the attenuator includes a plurality of semiconductor layers;
- in a portion of the output side lead-out line, a length of each of the plurality of semiconductor layers in a propagation direction of the modulation signal is ¼ or less of a guide wavelength of a maximum frequency in a band of the modulation signal;
- a width of the plurality of semiconductor layers in a direction perpendicular to the propagation direction of the modulation signal is ¼ or less of the guide wavelength; and
- a gap between the plurality of semiconductor layers in the propagation direction of the modulation signal is 50 µm or less.

13. The semiconductor Mach-Zehnder optical modulator according to claim 11, wherein:
- the optical waveguide includes a first arm waveguide and a second arm waveguide;
- the input side lead-out line includes a first input side lead-out line and a second input side lead-out line, the first input side lead-out line including a first end to which a modulation signal is input, the second input side lead-out line being on the dielectric layer adjacent to the first input side lead-out line and including a first end to which a signal complementary to the modulation signal is input;
- the phase modulation electrode line includes a first phase modulation electrode line and second phase modulation electrode line on the dielectric layer along the respective first and second arm waveguides, the first and second phase modulation electrode lines including first ends connected to respective second ends of the first and second input side lead-out lines;
- the output side lead-out line includes first and second output side lead-out lines, the first and second output side lead-out lines including first ends connected to respective second ends of the first and second phase modulation electrode lines; and
- the electrode includes a first electrode and a second electrode configured to apply respective modulation signals to the first and second arm waveguides, the respective modulation signals propagating through the first and second phase modulation electrode lines.

14. The semiconductor Mach-Zehnder optical modulator according to claim 13, further comprising:
- a first ground line along a propagation direction of the modulation signal on the dielectric layer outside the first input side lead-out line, the first phase modulation electrode line, and the first output side lead-out line; and
- a second ground line along the propagation direction of the modulation signal on the dielectric layer outside the second input side lead-out line, the second phase modulation electrode line, and the second output side lead-out line, wherein:
- in a portion of the first and second output side lead-out lines, a width of the at least one semiconductor layer in a direction perpendicular to the propagation direction of the modulation signal is equal to or more than a distance between the first and second ground lines, and
- the at least one semiconductor layer is disposed below edges of the first and second ground lines, the edges of the first and second ground lines being closer to respective output side lead-out lines than other edges of the first and second ground lines.

15. The semiconductor Mach-Zehnder optical modulator according to claim 13, wherein in a straight portion of the first and second output side lead-out lines, the at least one semiconductor layer is disposed such that a position of a midpoint between the first and second output side lead-out lines in a direction perpendicular to a propagation direction of the modulation signal matches a position of a center point of the at least one semiconductor layer in the direction perpendicular to the propagation direction of the modulation signal, and the at least one semiconductor layer has a cross-section that is bilaterally symmetric with respect to a perpendicular line in a thickness direction passing through the center point.

16. The semiconductor Mach-Zehnder optical modulator according to claim 13, wherein:
- the first and second output side lead-out lines are bent in a direction intersecting a direction in which the first and second arm waveguides extend in a plane of the dielectric layer, and
- in a bent portion of the first and second output side lead-out lines, the at least one semiconductor layer is disposed such that a center point of the at least one semiconductor layer in the direction perpendicular to a propagation direction of the modulation signal is disposed at an outer peripheral side of the bent portion of the first and second output side lead-out lines with respect to a midpoint between the first and second output side lead-out lines in the direction perpendicular to the propagation direction of the modulation signal.

17. The semiconductor Mach-Zehnder optical modulator according to claim 13,
wherein a line width of each of the first and second output side lead-out lines in a direction perpendicular to a propagation direction of the modulation signal is wider in a portion immediately under which the at least one semiconductor layer is not present than in a portion immediately under which the at least one semiconductor layer is present.

18. The semiconductor Mach-Zehnder optical modulator according to claim 13, further comprising:
- a first ground line along a propagation direction of the modulation signal on the dielectric layer outside the first input side lead-out line, the first phase modulation electrode line, and the first output side lead-out line; and a second ground line along the propagation direction of the modulation signal on the dielectric layer outside the second input side lead-out line, the second phase modulation electrode line, and the second output side lead-out line, wherein:

the first and second output side lead-out lines are bent in a direction intersecting a direction in which the first and second arm waveguides extend in a plane of the dielectric layer and each have a line width shorter in a bent portion than in a straight portion in the direction perpendicular to the propagation direction of the modulation signal; and the first and second ground lines are bent along the first and second output side lead-out lines and each have a shorter inter-line distance to a corresponding one of the first and second output side lead-out lines in the bent portion than in the straight portion.

19. The semiconductor Mach-Zehnder optical modulator according to claim 13, further comprising:

a first ground line along a propagation direction of the modulation signal on the dielectric layer outside the first input side lead-out line, the first phase modulation electrode line, and the first output side lead-out line;

a second ground line along the propagation direction of the modulation signal on the dielectric layer outside the second input side lead-out line, the second phase modulation electrode line, and the second output side lead-out line; and a plurality of wires electrically connecting between the first and second ground lines, wherein the plurality of wires are disposed at intervals of ¼ or less of a guide wavelength of a maximum frequency in a band of the modulation signal.

20. The semiconductor Mach-Zehnder optical modulator according to claim 1, wherein the attenuator is configured to attenuate the modulation signal by increasing propagation loss in the output side lead-out line.

* * * * *